(12) United States Patent
Zeng et al.

(10) Patent No.: US 12,523,536 B1
(45) Date of Patent: Jan. 13, 2026

(54) INTEGRATED ANTENNA HANDLE AND WIRELESS FOOD TEMPERATURE PROBE

(71) Applicant: Wuhan Topos Sensor Technology Co., Ltd., Ezhou (CN)

(72) Inventors: ZhaoTing Zeng, Shenzhen (CN); Hui Zhang, Shenzhen (CN); ShiHao Chen, Shenzhen (CN); KaiJin Xue, Shenzhen (CN)

(73) Assignee: Wuhan Topos Sensor Technology Co., Ltd., Ezhou (CN)

( * ) Notice: Subject to any disclaimer, the term of this patent is extended or adjusted under 35 U.S.C. 154(b) by 0 days.

(21) Appl. No.: 19/288,408

(22) Filed: Aug. 1, 2025

(30) Foreign Application Priority Data

Jul. 25, 2025 (CN) .......................... 202521569765.7

(51) Int. Cl.
*H01Q 1/22* (2006.01)
*G01K 1/02* (2021.01)
*G01K 1/024* (2021.01)

(52) U.S. Cl.
CPC ............... *G01K 1/024* (2013.01); *H01Q 1/22* (2013.01)

(58) Field of Classification Search
CPC ........... H01Q 1/22; G01K 1/08; G01K 13/00; G01K 1/024; G06K 19/07771
See application file for complete search history.

(56) References Cited

FOREIGN PATENT DOCUMENTS

| CN | 217605148 U | * | 10/2022 | ............. G01K 13/00 |
| CN | 118058970 A | * | 5/2024 | ....... G06K 19/07771 |
| CN | 223037261 U | * | 6/2025 | ................ G01K 1/08 |
| WO | WO-2024187782 A1 | * | 9/2024 | ............. G01K 1/024 |

* cited by examiner

*Primary Examiner* — Hoang V Nguyen
(74) *Attorney, Agent, or Firm* — JEEN IP LAW, LLC

(57) ABSTRACT

An integrated antenna handle and a wireless food temperature probe are provided. The integrated antenna handle of the present disclosure includes a handle body, a metal antenna is provided on an outer wall of the handle body, and a protective layer is provided on an outer wall of the handle body and covers the metal antenna. The integrated antenna handle is the first in the field of temperature measurement handles to achieve an external placement of the metal antenna on the outside of the handle, thus breaking through physical limitations of the handle on the metal antenna. The metal antenna is physically isolated from the power lines and sensor wires inside the outer wall of the handle body. The handle body can also be made of non-metallic materials, thereby greatly reducing the signal interference or shielding of the metal antenna.

9 Claims, 4 Drawing Sheets

INTEGRATED ANTENNA HANDLE AND WIRELESS FOOD TEMPERATURE PROBE

CROSS-REFERENCE TO RELATED APPLICATIONS

This application claims priority to Chinese Patent Application No. 202521569765.7, filed on Jul. 25, 2025, which is hereby incorporated by reference in its entirety.

TECHNICAL FIELD

The present disclosure relates to the field of food temperature measurement technologies, and in particular, to an integrated antenna handle and a wireless food temperature probe.

BACKGROUND

In the field of food temperature measurement, especially in the field of food temperature probe technology, the temperature signal detected by a temperature sensor is usually wirelessly sent to external devices through an antenna. Existing wireless temperature probes usually have a cavity structure inside the probe handle, and the antenna is provided in the form of a suspended metal wire in the handle cavity. One end of the antenna is connected to the circuit board inside the probe body, and the other end of the antenna is suspended.

This structure has the following technical issues: the metal material handle, or the metal structure on the handle, will have a shielding effect on the internal antenna. At the same time, the cavity structure of the handle is usually provided with power lines and sensor wires, which are arranged side by side with the antenna and are prone to signal interference with the antenna.

The antenna is fixed to the probe body by threading, and its position is prone to random deviation during installation. Even with other structural installation modes, the antenna position may have certain positional deviations, resulting in inconsistent signal transmission capabilities for the same batch of products.

The limited space of the cavity structure inside the handle limits the size of the antenna, rendering it impossible to optimize the transmission distance and communication frequency according to requirements, which restricts the applicability of the product. In particular, when the antenna and other wires are provided in the cavity structure inside the handle, the layout design between different types of wires also needs to be considered, thereby increasing the complexity of the internal structure of the handle.

SUMMARY

The purpose of the present disclosure is to provide an integrated antenna handle and a wireless food temperature probe to address the shortcomings of the existing technologies mentioned above.

According to the embodiments of the present disclosure, a first aspect of the present application is provided as follows: an integrated antenna handle, including: a handle body, which is provided with a metal antenna on an outer wall of the handle body; a protective layer, which is provided on an outer wall of the handle body and covers the metal antenna.

In some embodiments of the present disclosure, the handle body includes an internal cavity, and power lines and/or sensor wires are provided in the internal cavity.

In some embodiments of the present disclosure, the handle body is made of ceramic, and the protective layer is an enamel layer.

In some embodiments of the present disclosure, the handle body is made of ceramic, and the protective layer is a ceramic layer.

In some embodiments of the present disclosure, the metal antenna is a metal wire formed by firing metal paste printed on a surface of the ceramic body.

In some embodiments of the present disclosure, the metal antenna is a metal wire pre-set on an outer surface of the ceramic.

In some embodiments of the present disclosure, a cross-sectional shape of the handle body includes circular, square, elliptical, rectangular, and triangular.

In some embodiments of the present disclosure, a shape of the metal antenna includes linear, folded, spiral, grid, and F-shaped.

In some embodiments of the present disclosure, a cross-sectional shape of the metal antenna includes circular, semi-circular, semi elliptical, trapezoidal, rectangular.

In some embodiments of the present disclosure, a cross-sectional height h of the metal antenna is 0.001 mm≤h≤a thickness of the protective layer.

In some embodiments of the present disclosure, the handle body is provided with an antenna pad at a connection with the probe body, the antenna pad is connected to the metal antenna. When the handle body is connected to the probe body, the metal antenna is connected to a PCB inside the probe body through the antenna pad.

According to the embodiments of the present disclosure, using the integrated antenna handle in the first aspect provided by the present disclosure, a second aspect is provided as follows.

A wireless food temperature probe, including a probe body and the above integrated antenna handle, where the metal antenna of the integrated antenna handle is connected to the PCB inside the probe body.

Compared with existing technologies, advantageous effects of the technical solution provided in this application are as follows.

The integrated antenna handle is first in the field of temperature measurement handles to achieve the external placement of the metal antenna on the outside of the handle, thus breaking through the physical limitations of the handle on the metal antenna. The metal antenna is physically isolated from the power and sensor wires inside the outer wall of the handle body. The handle body can also be made of non-metallic materials, greatly reducing the signal interference or shielding of the metal antenna. The metal antenna is fixed on the surface of the handle through printing or preset modes, with good consistency in installation position, ensuring stable and consistent antenna performance for products in the same batch; the metal antenna is located on the outer wall of the handle body and is not limited by the internal cavity structure. It can be designed with larger sizes, thicker diameters, and more complex shapes according to requirements, thereby improving the flexibility of signal transmission distance and communication frequency selection. The surface of the antenna is covered with the enamel protective layer, which has the characteristics of insulation, wear resistance, high temperature resistance, and food contact, thereby adapting to environmental needs of food measurement scenarios. At the same time, the preparation process of the ceramic embryo and enamel layer is mature, thereby reducing production costs.

BRIEF DESCRIPTION OF DRAWINGS

In order to provide a clearer explanation of the embodiments of the present disclosure or the technical solutions in the prior art, a brief introduction will be given to the accompanying drawings required for the description of the embodiments or prior art. It is obvious that the accompanying drawings described below are only some embodiments of the present disclosure. For those skilled in the art, other drawings can be obtained based on these drawings without creative work.

Numeral reference: 10—handle body; 11—internal cavity; 20—metal antenna; 21—antenna pad; 30—protective layer.

DESCRIPTION OF EMBODIMENTS

In order to enable those skilled in the art to better understand the technical solutions in this application, the following will provide a clear and complete description of the technical solutions in the embodiments of this application in combination with the accompanying drawings. Obviously, the described embodiments are only a part of the embodiments of this application, not all of them. Based on the embodiments in this application, all other embodiments obtained by those skilled in the art without creative work are within the protection scope of this application.

The specific technical problem solved by this embodiment is that the existing food temperature probe needs to wirelessly transmit the temperature signal obtained by a sensor to an external device through an antenna when detecting an internal temperature of food. The existing temperature probe structure is to set a cavity structure inside a handle, and the wireless transmission antenna is provided in the form of a suspended metal wire inside the cavity structure. One end of the antenna is connected to the circuit board of the probe body, and the circuit board is connected to the temperature sensor. The other end of the antenna is suspended in the cavity structure inside the handle, and the temperature sensor is provided at a tip of the probe body to detect the temperature signal at a deepest point inside the food, which is transmitted through the antenna suspended in the handle. This structure has practical limitations, such as being prone to signal interference with the handle or other metal wires, and the size and shape of the antenna are limited by the cavity space inside the handle and cannot be made relatively large. In terms of product quality, the antenna structure suspended in the handle cavity inevitably generates significant positional deviations during installation, ultimately resulting in inconsistent signal transmission capabilities among products of the same batch.

Figure 1:
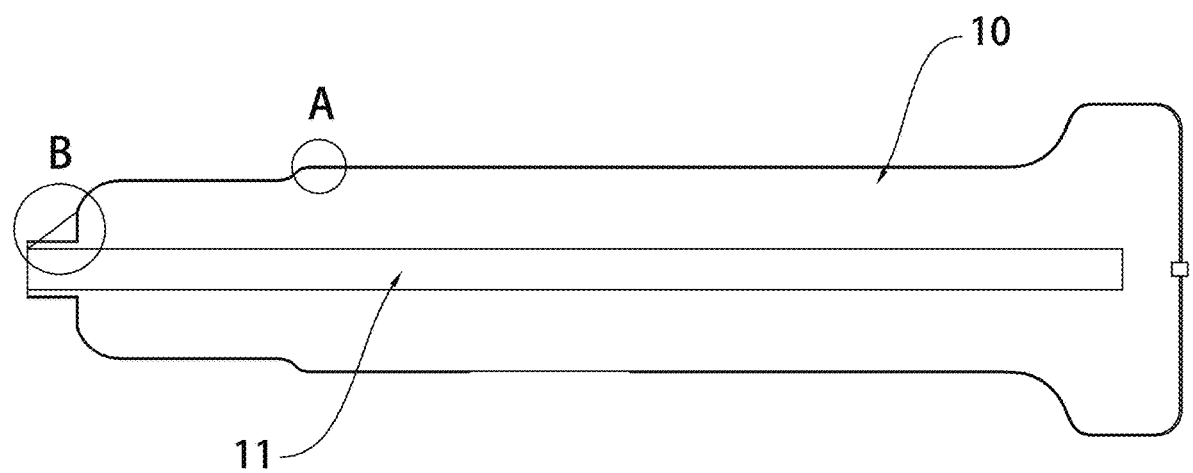
FIG. 1 is a schematic diagram of an overall structure of an integrated antenna handle in an embodiment.

In order to solve problems of handle limitation, wire interference, and product quality consistency, this embodiment proposes a new handle structure, an integrated antenna handle, as shown in FIG. 1, including a handle body 10, a metal antenna 20, and a protective layer 30. The metal antenna 20 is not provided in the cavity inside the handle body 10, but is provided on an outside of the handle body 10 and limited and protected by the protective layer 30.

A finished product of the integrated antenna handle has a three-layer structure, namely the handle body 10, the metal antenna 20, and the outer protective layer 30. In an implementation mode, the handle body 10 is made of ceramic, and the protective layer 30 is an enamel layer, which is fired and formed through thick film technology. In an implementation mode, the handle body 10 is made of ceramic, and the protective layer 30 is a ceramic layer, which is fired and formed through co firing technology.

In terms of structural, the metal antenna 20 is provided on the outside of the handle body 10, naturally forming physical isolation from power lines, sensor wires, etc., greatly reducing signal interference to the metal antenna 20 and avoiding signal shielding by the handle body 10 itself.

In terms of size, the metal antenna 20 is no longer limited by the volume of the internal cavity 11 inside the handle body 10.

In terms of performance, antennas with larger sizes, thicker diameters, and more complex shapes can be set according to requirements, thereby improving the flexibility of signal transmission distance and communication frequency selection.

In terms of product consistency, the metal antenna 20 is fixed on a surface of the handle through printing or preset methods, with good consistency in installation position, ensuring stable and consistent antenna performance for products in the same batch.

In terms of production technology, the handle body 10 is selected as the ceramic embryo, the protective layer 30 is selected as the enamel layer, and the metal antenna 20 is selected as the metal wire printed on the surface of the ceramic embryo and fired into shape with a metal paste. Through a single firing process, the process is mature, stable, and cost-effective.

In an implementation mode, a cross-sectional shape of the handle body 10 includes circular, square, elliptical, rectangular, and triangular shapes. Printing the printed metal antenna 20 in a three-dimensional structure on the surrounding surface of the handle body 10 is a breakthrough innovation in the field of temperature probes in this solution. The handle body 10 is usually a circular handle, but other square, triangular, and other shaped handles are also within the protection scope of this application.

Figure 2:
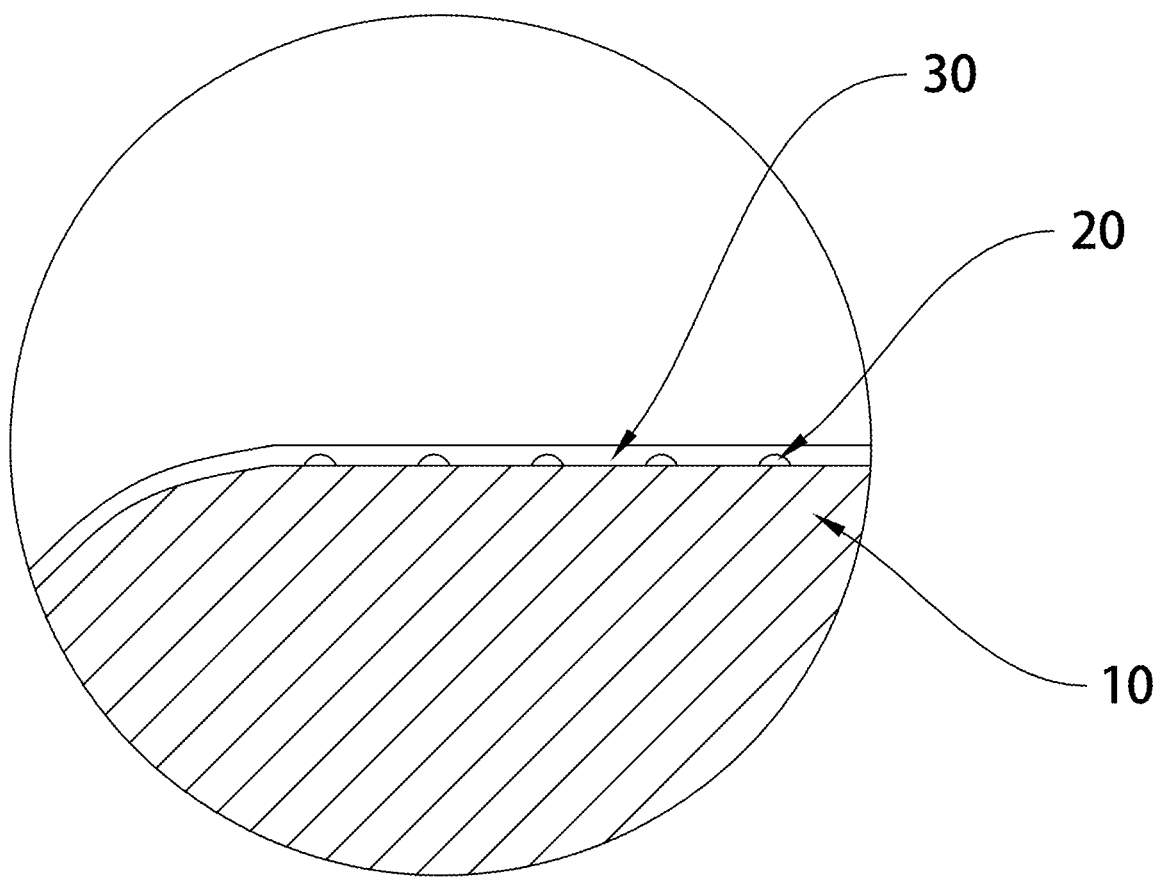
FIG. 2 is a partial schematic diagram A of the integrated antenna handle in an embodiment.
Figure 4:
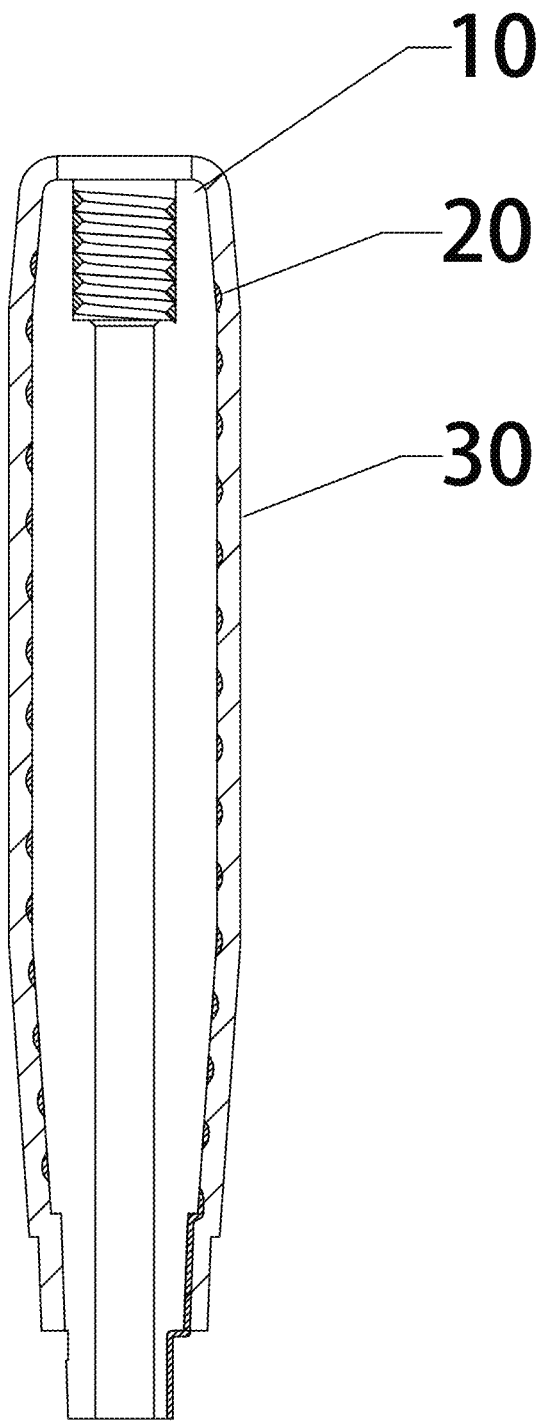
FIG. 4 is a schematic diagram of a spiral spring shaped metal antenna in an embodiment.

In an implementation mode, an overall shape of the metal antenna 20 can be traditional linear, polygonal, or F-shaped. In an implementation mode, as shown in FIGS. 2 and 4, which can be a spiral spring shape that is rotated around the handle body 10 and can also be other complex grid structures.

In an implementation mode, a cross-sectional shape of sintered metal antenna 20 can be circular, semi-circular, semi elliptical, trapezoidal, rectangular, in an implementation mode, it is semi-circular and rectangular.

In an implementation mode, a size of the metal antenna 20 is selected according to requirements, with a height usually greater than 0.001 mm and a maximum thickness of 30 for the protective layer. In an implementation mode, it is not ruled out that the metal antenna 20 may exceed the protective layer by 30.

Figure 3:
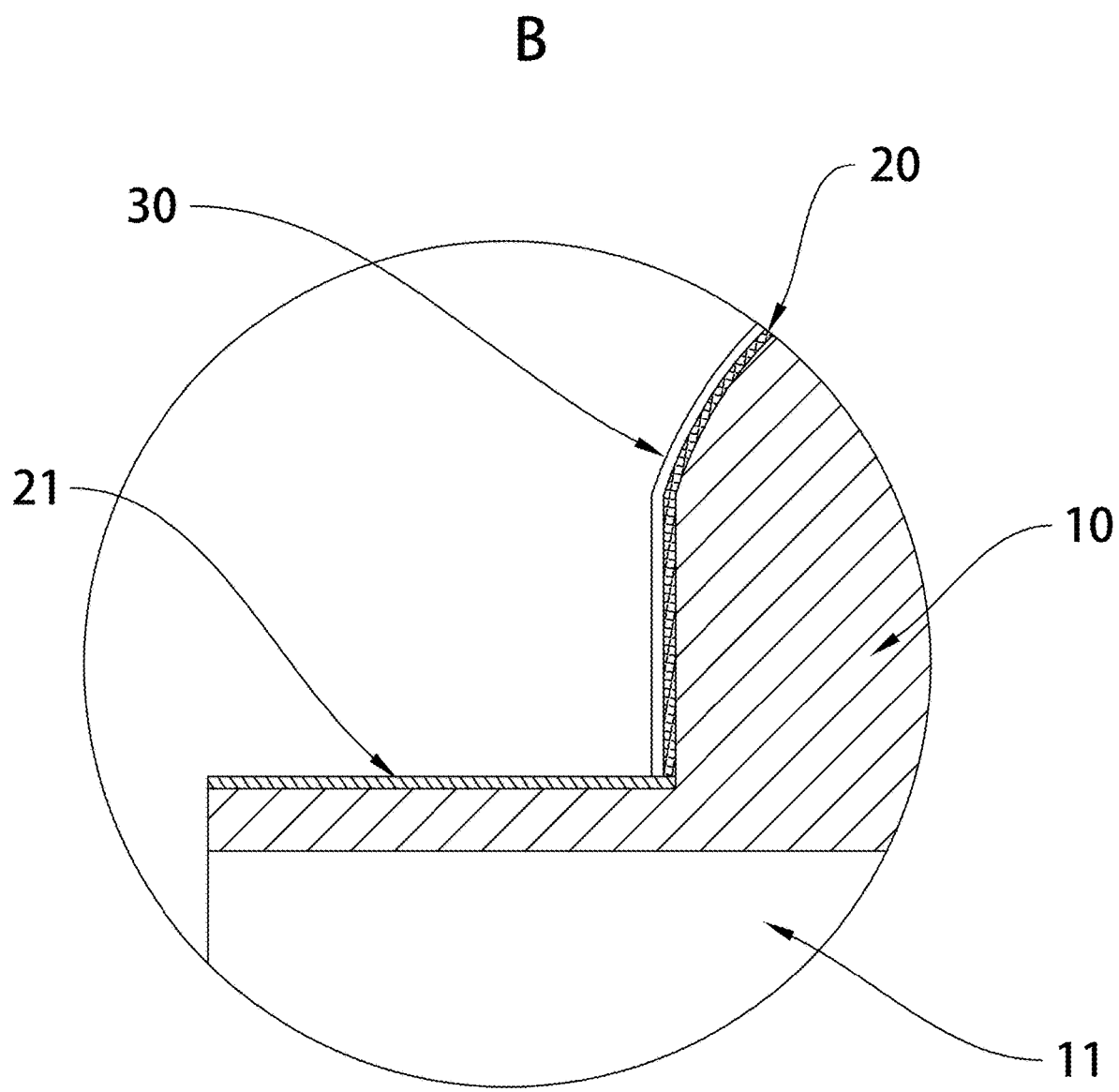
FIG. 3 is a partial schematic diagram B of the integrated antenna handle in an embodiment.

In an implementation mode, as shown in FIG. 3, the handle body 10 is provided with an antenna pad 21 at a connection with the probe body. The antenna pad 21 is connected to the metal antenna 20. When the handle body 10 is connected to the probe body, the metal antenna 20 is connected to a PCB inside the probe body through the antenna pad 21.

This embodiment provides a wireless food temperature probe, including a probe body and an integrated antenna handle. The integrated antenna handle includes a handle body 10, and a metal antenna 20 provided on an outer wall of the handle body 10; a protective layer 30 provided on an outer wall of the handle body 10 and covers the metal antenna 20. The metal antenna 20 of the integrated antenna handle is connected to a PCB inside the probe body.

The various technical features of the above embodiments can be combined arbitrarily. In order to make the description concise, not all possible combinations of the various technical features in the above embodiments have been described. However, as long as there is no contradiction in the combination of these technical features, they should be considered within the scope of this specification. The above embodiments only express several embodiments of the present application, and their descriptions are more specific and detailed, but should not be understood as limiting the scope of the present patent application. It should be noted that for those skilled in the art, several modifications and improvements can be made without departing from the concept of this application, which are within the protection scope of this application.

It should be noted that when a component is referred to as "fixed" or "set" on another component, it can be directly or indirectly provided on another component; when a component is referred to as "connected" to another component, it can be directly or indirectly connected to another component. It should be understood that terms "length", "width", "up", "down", "front", "back", "left", "right", "vertical", "horizontal", "top", "bottom", "inside", "outside" and other directional or positional relationships indicated are based on the directional or positional relationships shown in the accompanying drawings, and are only for the convenience of describing and simplifying the present application, and do not indicate or imply that the device or component referred to must have a specific orientation, be constructed and operated in a specific orientation, and therefore cannot be understood as a limitation on the present application.

Besides that, terms "first" and "second" are only used for descriptive purposes and cannot be understood as indicating or implying relative importance or implying the number of technical features indicated. Thus, the features limited to "first" and "second" may explicitly or implicitly include one or more of these features. In the description of this application, the meanings of "multiple" and "several" refer to two or more, unless otherwise specified.

Note that the structure, proportion, size, etc. shown in the accompanying drawings of this specification are only for the purpose of cooperating with the content disclosed in the specification, for the understanding and reading of those familiar with this technology, and are not intended to limit the conditions that can be implemented in this application. Therefore, they do not have substantive technical significance. Any modification of the structure, change in proportion relationship, or adjustment of size should still fall within the scope of the technical content disclosed in this application, without affecting the efficacy and purpose that can be achieved.

What is claimed is:

1. An integrated antenna handle, comprising:
    a handle body, which is provided with a metal antenna on an outer wall of the handle body;
    a protective layer, which is provided on an outer wall of the handle body and covers the metal antenna,
    wherein the handle body is made of ceramic body;
    wherein the metal antenna is a metal wire formed by firing metal paste printed on a surface of the ceramic body.

2. The integrated antenna handle according to claim 1, wherein the handle body comprises an internal cavity, and power lines and/or sensor wires are provided in the internal cavity.

3. The integrated antenna handle according to claim 1, wherein the protective layer is an enamel layer.

4. The integrated antenna handle according to claim 3, wherein the metal antenna is a metal wire pre-set on an outer surface of the ceramic body.

5. The integrated antenna handle according to claim 1, wherein the protective layer is a ceramic layer.

6. The integrated antenna handle according to claim 1, wherein a cross-sectional shape of the handle body comprises at least one of circular, square, elliptical, rectangular, and triangular.

7. The integrated antenna handle according to claim 1, wherein a shape of the metal antenna comprises at least one of linear, folded, spiral, grid, and F-shaped.

8. The integrated antenna handle according to claim 1, wherein a cross-sectional height h of the metal antenna is 0.001 mm≤h≤a thickness of the protective layer.

9. A wireless food temperature probe, comprising: a probe body and the integrated antenna handle according to claim 1, wherein the metal antenna of the integrated antenna handle is connected to a PCB inside the probe body.

* * * * *